(12) United States Patent
Al-Modiny

(10) Patent No.: US 6,284,987 B1
(45) Date of Patent: Sep. 4, 2001

(54) EMBEDDED WEIGHT SCALE

(76) Inventor: Khalid F. Al-Modiny, P.O. Box 51174, Riyadh 11543 (SA)

( * ) Notice: Subject to any disclaimer, the term of this patent is extended or adjusted under 35 U.S.C. 154(b) by 0 days.

(21) Appl. No.: 09/354,740

(22) Filed: Jul. 29, 1999

(51) Int. Cl.[7] .......................... G01G 23/14; G01G 21/08; G01G 23/01
(52) U.S. Cl. .......................... 177/170; 177/171; 177/203; 177/235; 177/256; 177/260; 73/1.13
(58) Field of Search .................... 177/170, 171, 177/172, 203, 235, 236, 237, 238, 256, 257, 258, 259, 260; 73/1.13, 1.15

(56) References Cited

U.S. PATENT DOCUMENTS

| | | | |
|---|---|---|---|
| 3,661,222 | * | 5/1972 | Weickhardt ........................ 177/178 |
| 3,693,739 | * | 9/1972 | Kaloustian et al. ................. 177/214 |
| 3,773,124 | * | 11/1973 | Bellivant .............. 177/210 |
| 3,788,411 | * | 1/1974 | Oxley .................... 177/211 |
| 3,791,467 | * | 2/1974 | Swersey et al. ..................... 177/157 |
| 3,810,638 | * | 5/1974 | Haack .................... 177/213 |
| 3,869,009 | | 3/1975 | Kuhnle .................... 177/217 |
| 4,084,650 | * | 4/1978 | Terraillon ............................. 177/174 |
| 4,319,651 | * | 3/1982 | Robichaud ........................... 177/229 |
| 4,382,478 | * | 5/1983 | Hern . | |
| 4,399,881 | * | 8/1983 | Theurer et al. ....................... 177/137 |
| 4,524,617 | * | 6/1985 | Krehel et al. .......................... 177/245 |
| 4,715,458 | * | 12/1987 | De Angelis et al. ................. 177/172 |
| 4,878,356 | * | 11/1989 | Punches et al. ...................... 177/116 |
| 5,031,710 | * | 7/1991 | Parker et al. .................... 177/210 FP |
| 5,555,764 | * | 9/1996 | Dybas .................................. 177/208 |
| 5,721,400 | * | 2/1998 | Haraldsson et al. ................. 177/256 |

OTHER PUBLICATIONS

Japanese Patent Abstract—Title: Display Unit for Capacity of Vessel Such as Thermos; Application No. 54092296; Publication Date: Feb. 18, 1981.

* cited by examiner

*Primary Examiner*—Randy W. Gibson
(74) *Attorney, Agent, or Firm*—Lawrence P. Trapani

(57) ABSTRACT

A weighing scale detects and indicates changes in a small weight that is embedded within a much larger residual weight. The scale device has a base and a top weighing pan above it, with a linkage supported between the base and the top pan. A counterbalance weight lever is supported on a pivot member, and has one end connected to the linkage, and a counterbalance weight on the other end. An adjustable tensioning spring provides a balancing force for the counterbalance weight lever within the weight range of the critical weight. A potentiometer of other detecting device can provide an electrical signal to an alarm device to warn the consumer that the weight of a consumable quantity has dropped into the critical weight range.

15 Claims, 5 Drawing Sheets

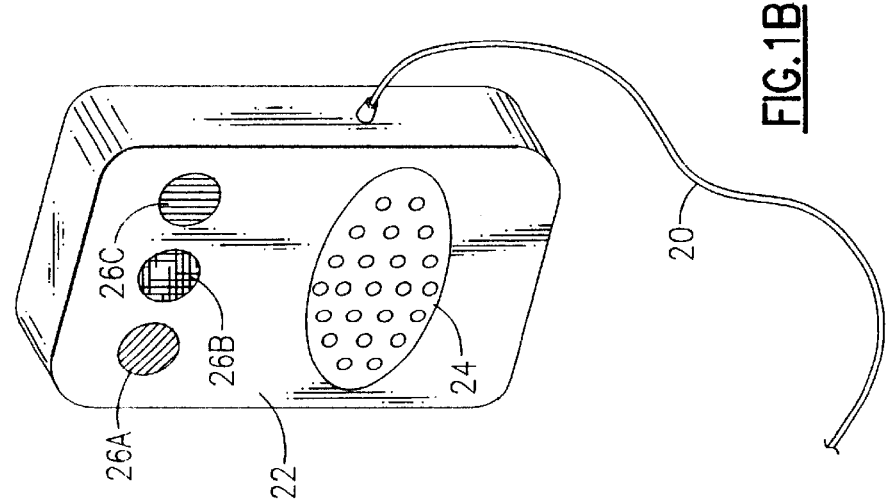
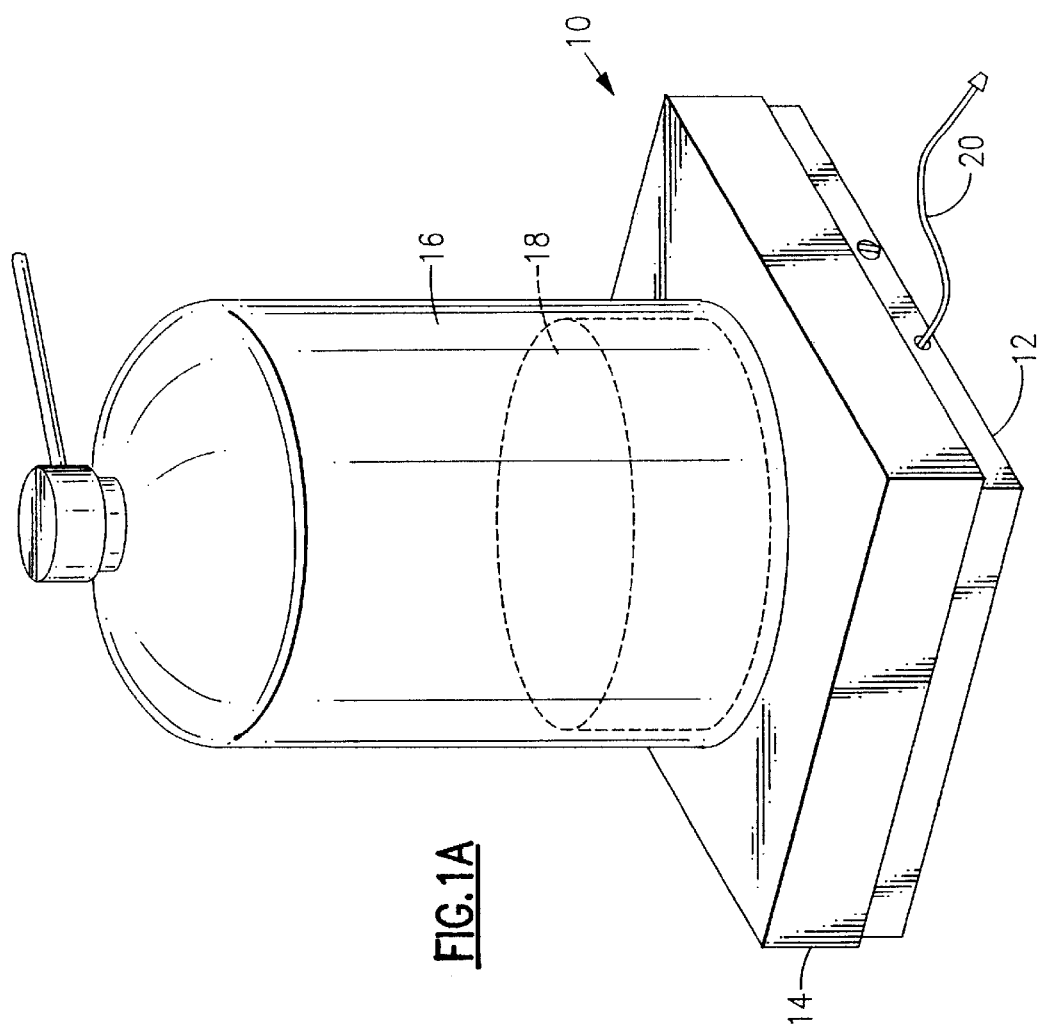

EMBEDDED WEIGHT SCALE

BACKGROUND OF THE INVENTION

The present invention relates to weighing scales, and is more particularly directed to a device for detecting and indicating changes in a small weight that is embedded within a much larger, i.e., heavier, residual weight.

It is difficult for the consumer to measure a small variable weight that is contained within a much larger weight, most of which is a relatively constant residual weight. It is also difficult to monitor and obtain an advance warning of the impending exhaustion of a given variable weight, which can be considered a critical weight.

A weight load can be considered to consist of two or more components, that is, an initial part, a critical part, and an end part. The critical part is typically significantly smaller than either of the other two components, but this is typically the component whose weight is of the most interest. Consequently, any weighing device that detects variations, i.e., gradual depletion, of the critical component should have a more sensitive scale for the critical part than for the other two parts. In many cases, the consumer needs to monitor only the critical part, and the weighing device or scale only needs to read and monitor the critical component, and not the initial or end parts.

A particular example of this is a cylinder of a consumable gas, such as propane or natural gas. The cylinder has an empty or residual weight which does not vary for that cylinder. Also, when completely filled with propane or natural gas, the cylinder has a full or initial weight, which also is a fixed value for that cylinder. The customer is interested in monitoring the weight of the cylinder so that he or she will be aware when the contents have been nearly consumed, and the cylinder is approaching an empty condition. Where the cylinder contains, for example, ten kilograms of propane, the consumer needs to know when it has emptied down to about the final one or two kilograms, which constitute the "critical weight." Consequently, the weighing scale needs to monitor only for that range of zero to two kilograms, which lies somewhere between the cylinder's residual weight and the cylinder's full or initial weight. Thus, there is a need for a weighing device that monitors the critical part of the load.

There are many other applications as well, where the critical part of the load is embedded within the overall weight of the load, between the residual weight and the initial weight. There may also be a need to monitor the fill, rather than the depletion of a container's contents, in which case the critical weight would be increasing instead of decreasing. The critical weight range can be close to the initial weight instead of close to the residual weight.

OBJECTS AND SUMMARY OF THE INVENTION

Accordingly, it is an object of this invention to provide a weighing and monitoring technique that avoid the drawbacks of the prior art.

It is another object to provide a weighing scale of simple design which accurately monitors the critical part of the weight load.

It is yet another object to provide a weighing scale that can be adjusted for its range and sensitivity in measuring changes within the critical weight range.

It is a further object to provide a weighing scale of rugged design and which can provide an audible and/or visible alarm.

In accordance with an aspect of the present invention, an embedded weight scale indicates variations in weight of an article wherein the variable weight is embedded within a heavier weight, and where the article has a base residual weight and a variable embedded weight. The scale has a base with first and second upstanding walls and a top pan adapted for supporting the article whose weight is to be monitored. There is a linkage, in this case formed of a pair of long levers and a pair of short levers. The long levers each have a first end pivotally supported on the first wall of the base and a second end, the second ends being joined together by a pivot pin or the like. The short levers each have a first end pivotally supported on the second wall of the base, and each has a second end that is pivotally joined to a midpoint of a respective one of the long levers. The top pan is supported at four points, i.e., at a respective position on each of the long levers and the short levers. There is a counterbalance pivot on said base, and this is preferably customer adjustable, i.e., by turning a wheel or screw. A counterbalance weight lever is joined at its first end to the second ends of said long levers, and this lever extends across the base, over the counterbalance pivot, to a second end. A counterbalance weight is supported on the second end of this counterbalance weight lever. The counterbalance weight lever has a range of movement that corresponds to the range of weight that includes the embedded weight, i.e., the critical weight, of the article.

An adjustable tensioning spring means permits the consumer to adjust the tension between the base and the long levers. Weight indicating means are also provided, including a sensor for sensing variation in the position of the counterbalance weight lever as it moves within its range, i.e., within the critical weight range of the embedded weight.

The weight indicating means may take the form of a potentiometer having a rotary slider, and a lever connecting the slider with the counterbalance weight lever. A gear multiplier or other means can be employed to increase the sensitivity range of the potentiometer.

The adjustable tensioning spring means can employ a spring holder plate affixed to said base, a spring tension adjusting screw on the spring holder plate, and a tensioning spring positioned between the spring holder plate and the second ends of the long levers.

The counterbalance weight may be selectively adjustable in its position on the counterbalance weight lever, so as to adjust the critical weight range. Also, there are stops provided to limit the movement of the counterweight lever, with the positions of the stops being selected to affect the selection of the critical weight range.

As can be understood, the range of counterbalance movement is governed by the height of the unit, and the positions of the stops, whereas the range of the critical weight is governed by the settings of the counterbalance weight, the counterbalance pivot, and the spring.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWING

FIG. 1A is perspective view of an embedded weight scale monitoring unit and load, in the form of a cylinder of propane or liquefied natural gas, according to an embodiment of this invention.

FIG. 1B shows the warning unit of this embodiment.

DETAILED DESCRIPTION OF THE PREFERRED EMBODIMENTS

Figure 2:
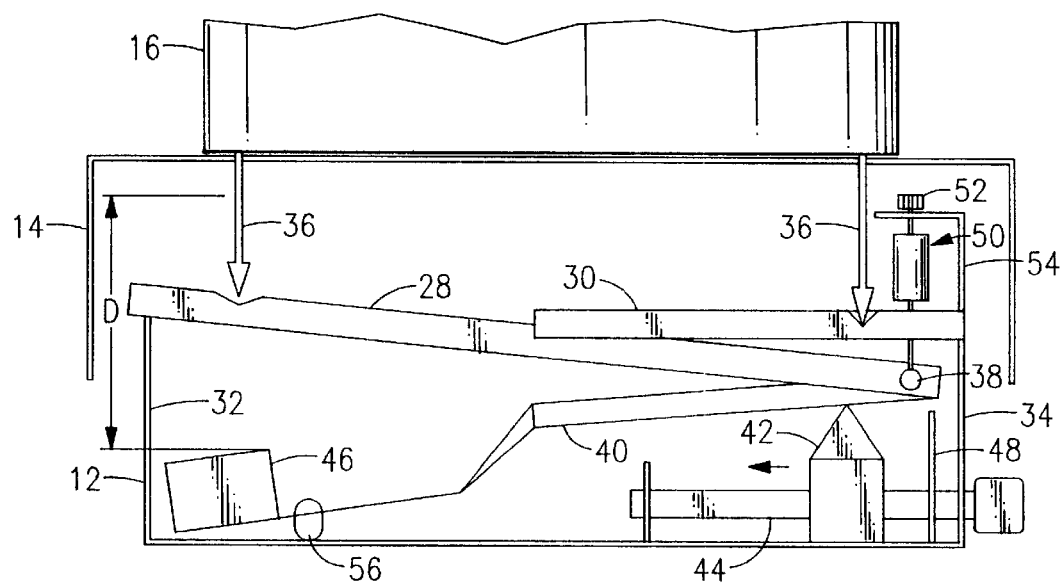
FIG. 2 is a schematic sectional elevation of the monitoring unit of this embodiment.

With reference to the Drawing, an embodiment of the embedded weight measuring weighing scale of this invention is shown in FIGS. 1A and 1B. Here, a weighing scale device 10 has a rectangular or square base 12, and a top or weighing pan 14 supported over the base 12. A load 16 is shown here to take the form of a gas cylinder, with a fill of a compressed consumable gas, such as propane or liquid natural gas. This is only an example, of course, and the load 16 can be any load that has a basic, residual weight, and a larger total weight when filled. In this embodiment the tank or cylinder 16 is shown with a partial remaining fill 18 (shown in ghost lines), with the contents being depleted and approaching exhaustion. In this example, the empty weight of the cylinder or tank may be, for example ten KG, and the contents of the tank, when filled may be a similar weight, that is, another ten KG. The customer is interested in being alerted when the tank is nearing exhaustion, that is, when there are about two KG of gas remaining inside the cylinder 16. This last two KG of gas is considered the critical weight in this example. That is, the cylinder has an initial (filled) weight of twenty KG, a residual (empty) weight of ten KG, and a critical weight range between ten and twelve KG. A wire or cable 20 extends from the weighing or sensing unit 10 to an alarm or customer interface unit 22, which is shown in FIG. 1B. The unit 22 may have an audible alarm to alert the consumer when the critical weight is detected, and may also have visible indicators, here a green lamp 26A which lights to indicate that the weight is above the critical weight range, a yellow lamp 26B to provide a warning when the weight has dropped into the critical range, and a red lamp 26C to provide a warning when the weight has dropped below the critical range, i.e., the propane or natural gas is exhausted. The unit 22 contains batteries and electronic circuitry, which are not shown here.

Figure 3:
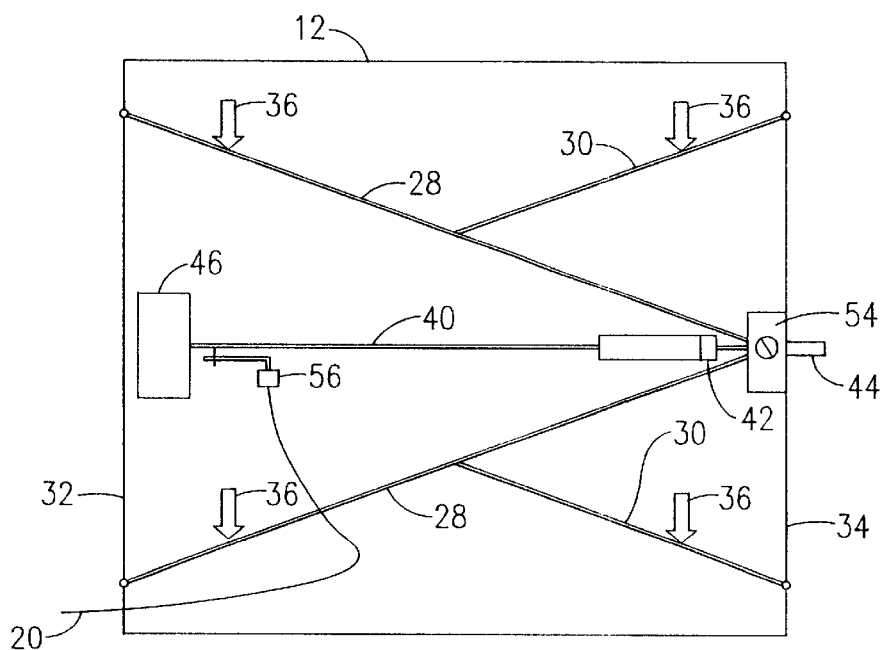
FIG. 3 is a schematic top view of this embodiment.

The construction of the weighing scale device 10 is illustrated in FIGS. 2 and 3. As shown, there is a linkage mechanism between the base 12 and the top pan 14, in this case formed of a pair of long levers 28 and a pair of short levers 30. The long levers 28 have one end pivoted on a back wall 32 of the base 12, and the short levers 30 have one end pivoted on a front wall 34 of the base, with another end pressing down at the midpoints of the long levers 28, respectively. The top or pan 14 is shown to have four legs 36 that extend down and rest upon locations along the long and short levers 28, 30, respectively. There is a pivot pin 38 through the second or free ends of the two long levers 28.

A counterbalance weight lever 40 has one end attached to the long levers at the pivot pin 38, and proceeds from there towards the back wall 32 of the base 12. A movable pivot 42 is positioned on the base 12 and the lever 40 rests upon the pivot 42. A pivot adjusting screw 44, which is user actuable, permits the user to adjust the position of the pivot relative to the lever 40. A counterbalance weight 46 is positioned at the rear end of the counterbalance weight lever 40, and may be adjustable in its position along the lever. Shown near the front wall 34 of the base 12 is a stopper 48 (which may be either factory-set or field-adjustable) that limits the downward motion of the second ends of the long levers 28 and the front end of the counterbalance weight lever 40.

An adjustable spring 50 is positioned at the second ends of the long levers 28, and its tension is user-adjustable by means of a spring tension adjusting screw 52. A spring holder plate 54 holds the spring in position at the front wall 34 of the base, so that there is a spring tension accorded between the base 12 and the counterbalance weight lever 40. Also shown is a sensor element 56, e.g., a potentiometer, which serves as an active detector and is sensitive to upwards or downwards motion of the counterbalance weight lever 40.

Figure 4A:
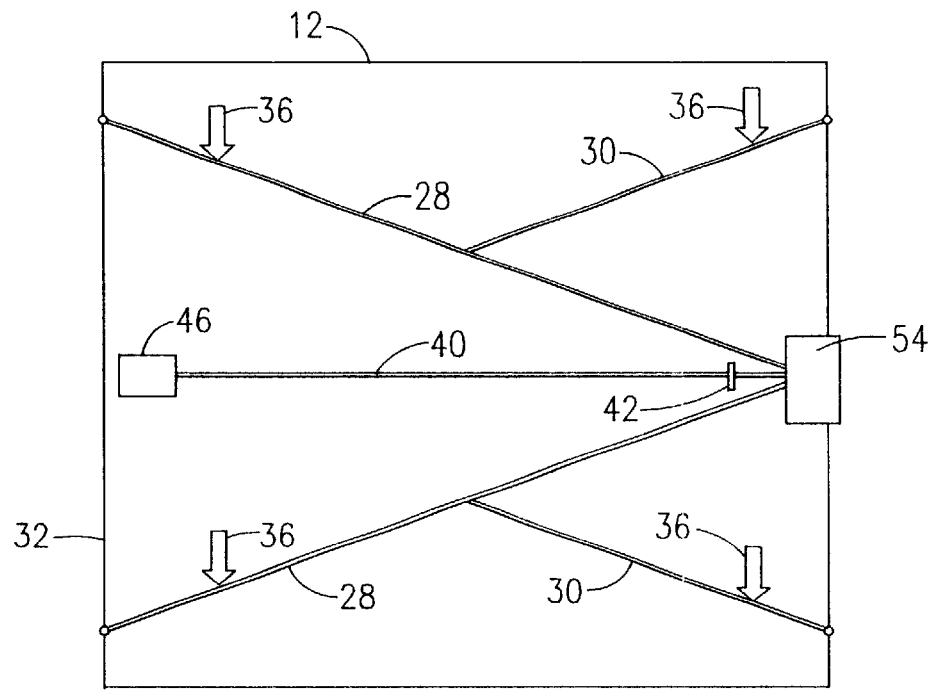
FIGS. 4A and 4B are schematic top plan and side views for explaining the operation of this embodiment of this invention.
Figure 4B:
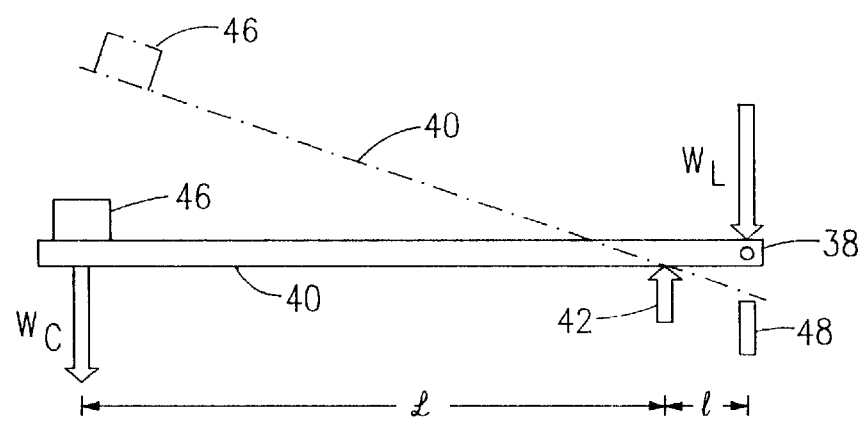

As shown in FIGS. 4A and 4B, the weight of the load 16, which is transmitted via the legs 36 to the long levers 28 and short levers 30, creates an image load or virtual load weight $W_L$ at the position of the pivot pin 38, i.e., at the end of the counterbalance weight lever 40. At the other end of the lever 40, the counterbalance weight has a weight $W_C$. The pivot 42 is positioned to define a lever arm l between the pivot and the virtual weight $W_L$, and a counterbalance lever arm L between the counterbalance weight 46 and the pivot 42. The virtual weight $W_L$ depends on the actual weight of the load 16, and the virtual weight $W_L$ is in balance with the counterbalance weight $W_C$ when this relation is satisfied: $L \times W_C = l \times W_L$. When the load 16 is above the critical range, the lever 40 is deflected to a maximum point d determined by the stopper 48. When the load weight drops into the critical range, the virtual weight $W_L$ is balanced by the counterbalance weight $W_C$, and the lever 40 moves through a deflection range D, i.e., until the counterbalance weight 46 bottoms out and rests on the base 12. In this range, the lever 40 is free to move up and down, and changes in the virtual weight $W_L$ are balanced by increasing or decreasing the tension on the spring 50 under deflection of the lever 40. The sensitivity in this range depends on the spring setting, which the user can adjust by means of the adjusting screw 52. The lengths of the lever arms L and l can be adjusted by moving the pivot 42, and also by moving the counterbalance weight 46. Also, the size of the counterbalance weight 46 can be adjusted, i.e., by adding trim weights.

Figure 5A:
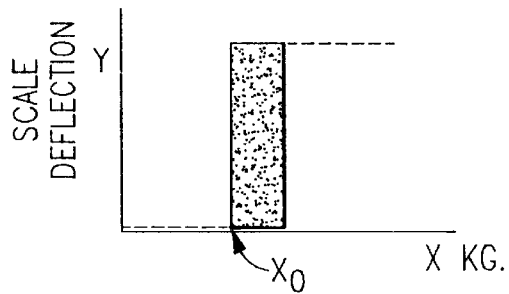
FIGS. 5A and 5B are charts for explaining the dependency of counterbalance weight.
Figure 5B:
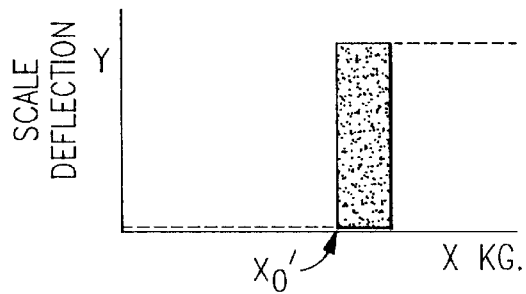
Figure 6A:
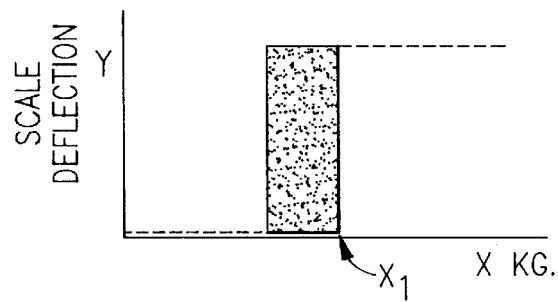
FIGS. 6A and 6B are charts for explaining the dependency of spring and stopper settings.
Figure 6B:
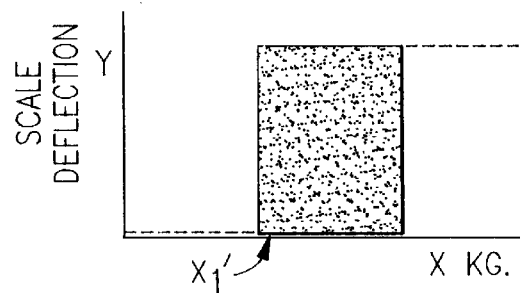
Figure 7A:
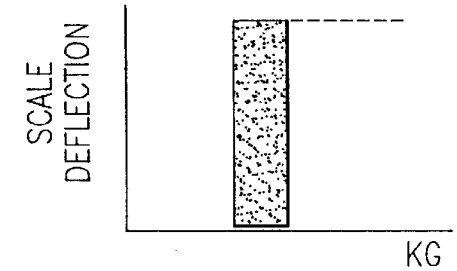
FIGS. 7A and 7B are charts for explaining sensitivity in the critical weight range.
Figure 7B:
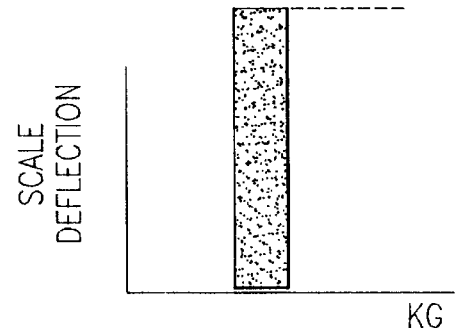

The initial weight value for the scale 10 can be set by adjusting the counterbalance weight value, and its position on the lever 40, i.e., from a relatively lower value $x_0$ to a higher value $x_0'$, as shown in FIGS. 5A and 5B. This does not affect the width of the critical range. The other bound of the critical range can be adjusted by adjusting the spring 50 and/or the stopper 48, i.e., from a relatively lower setting $x_1$, (FIG. 6A) to a relatively higher setting $x_1'$, (FIG. 6B). This can widen or narrow the range of interest, i.e., the critical range. The sensitivity to load weight variation within the critical range of deflection can depend on the sensitivity of the potentiometer 58, as well as various mechanical parameters, such as the spring constant (stiffness) of the spring 50.

Figure 8:
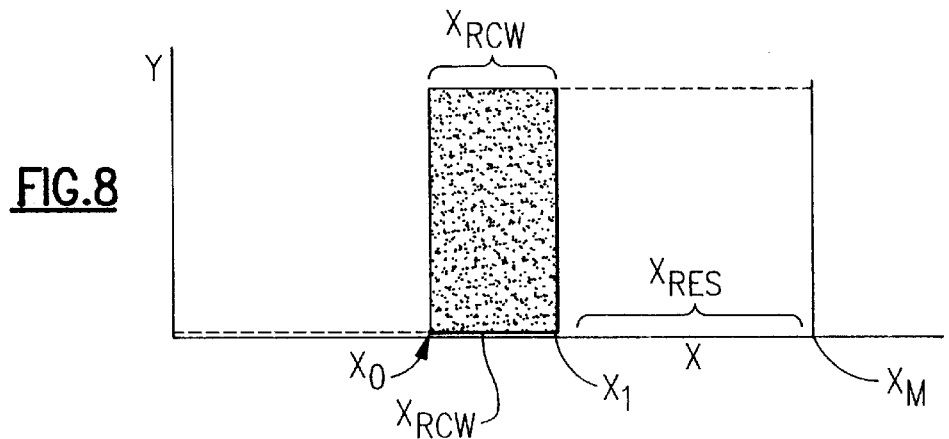
FIG. 8 is a graphical chart for explaining the general principles of the counterbalance weight leverage system employed in this embodiment.

FIG. 8 is a chart for explaining the operation of the unit 10, i.e., calibrated to sense the critical weight range 18 of the propane or natural gas cylinder 16 of FIG. 1. Here, the abscissa shows values of load weight values, with $X_0$ corresponding to the residual weight, i.e., the empty weight of the tank or cylinder 16; $X_{RCW}$ corresponds to the critical weight range, i.e., the final two KG 18 of propane or natural gas in the cylinder, with $X_1$ being the upper limit of the critical weight range $X_{RCW}$. Above this is the residual weight range $X_{RES}$, which is limited by the maximum rated weight $X_M$ for the scale. The expected full weight of the cylinder 16 would be somewhat smaller than this value $X_M$. Deflection of the counterbalance weight lever 40 is depicted on the ordinate. This also corresponds to the scale sensitivity.

The stopper 48 blocks any deflection of the counterbalance weight lever 40 for weights in the range $X_{RES}$, and the counterbalance weight 46 is bottomed out in its range for load values at or below the residual value $X_0$. For loads in the critical range $X_{RCW}$, the action of the spring 50 determines the deflection of the lever 40.

Figure 9:
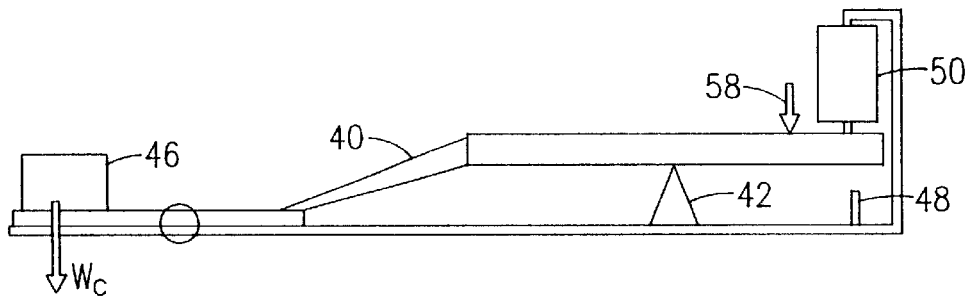
FIG. 9 is a schematic side view of the counterbalance weight lever for explaining this embodiment.

As shown in FIG. 9, a virtual load bearing point 58 is shown on the counterbalance weight lever 40 to the right of the pivot 42. At the position shown, the scale is at or below the residual weight, and the counterbalance weight 46 is fully descended. The beginning of the critical weight range, i.e., the value $X_1$, is characterized by the right end of the lever 40 being descended into contact with the stopper 48. The weight values where these occur depends on the size of the weight 46 and its position along the lever 40, and also on the position of the pivot 42. These depend to some extent as well on the stiffness of the spring 50, and its tension. Thus, the customer or user can field-adjust the scale 10 to adjust the weight values in which an alarm or warning is received.

Figure 10:
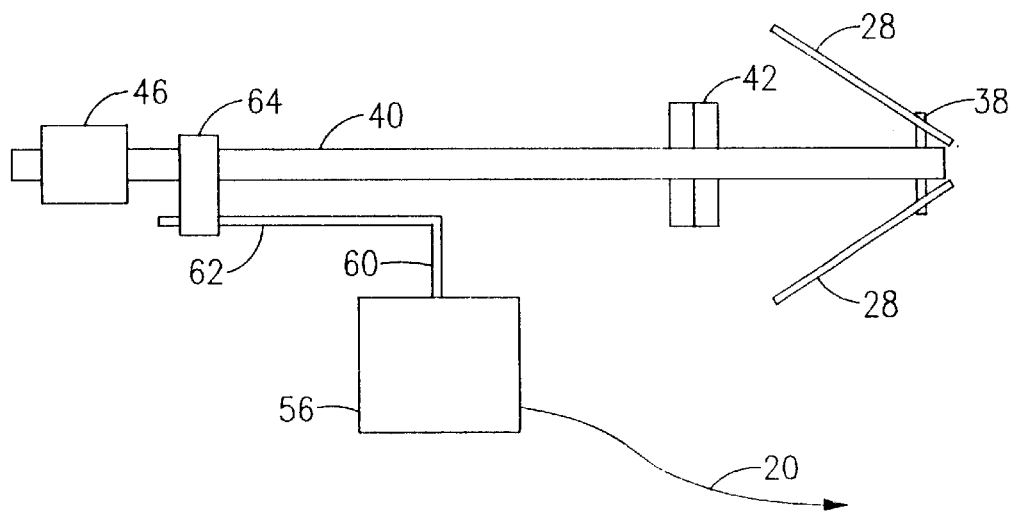
FIG. 10 is a top view of the counterbalance weight lever and sensor element of this embodiment.

As shown in FIG. 10, the sensor element for this weighing scale can be a potentiometer 56, here of the rotary type, with a rotor stem 60 for moving the rotary wiper of the potentiometer. The rotor stem 60 has attached to it a potentiometer lever arm 62, whose distal end is coupled to a mover element on the lever 40, so that the potentiometer rotor stem 62 follows the up and down motion of the counterbalance weight lever 40. This can be mechanically arranged for optimal sensitivity. In one possible arrangement, a planetary gear multiplier can be used to increase the angular response of the potentiometer 56 to motion of the lever 40. Also, instead of a potentiometer, other devices may be used, such as a magnetic sensor (i.e., Hall device), optical indexer, or other known arrangement.

Also, instead of the coil spring 50 shown here, another spring arrangment, e.g., a leaf spring or a torsion spring could be employed. In addition, the spring 50 could include an air bladder or other resilient means within the ambit of the present invention. The spring 50 may be positioned either above or below the lever 40.

Also, the scale need not have the square or rectangular shape as shown. Also, in some versions, rather than using the stopper 48 to limit the motion of the lever 40, the lever 40 and the counterbalance weight 46 can be limited in their upward direction by the height of the unit.

While the invention has been described in detail with respect to one preferred embodiment, it should be recognized that there are many alternative embodiments that would become apparent to persons of skill in the art. Many modifications and variations are possible which would not depart from the scope and spirit of this invention, as defined in the appended claims.

I claim:

1. A weight scale for indicating variations in weight of an article, the article being characterized as having a first weight, a second weight, a full range of weight values between the first and the second weights, and a critical weight range that is less than the full range, the scale comprising:

a base;

a top pan above said base and adapted for supporting said article;

linkage means disposed between said base and said top pan for transmitting the weight of said article, and having a weight point on which appears a virtual weight that represents the weight of said article;

a counterbalance pivot on said base;

a counterbalance weight lever having a first end coupled to the weight point of said linkage means, said counterbalance weight lever extending across said counterbalance pivot to a second end, and including a counterbalance weight supported on said second end thereof, said counterbalance weight lever having a range of movement that substantially corresponds to the critical weight range of the article;

an adjustable tensioning spring means for applying an adjustable tension on said counterbalance weight lever at the weight point of said linkage means; and weight indicating means including a sensor for sensing variation in the position of said counterbalance weight lever within its range of movement.

2. The weight scale of claim 1 wherein said weight indicating means includes a potentiometer having a rotary slider, and a lever connecting said slider with said counterbalance weight lever.

3. The weight scale of claim 1 wherein said base has first and second upstanding walls; and wherein said linkage means includes a pair of long levers each having a first end pivotally supported on the first wall of the base and a second end, the second ends being joined together; and a pair of short levers each having a first end pivotally supported on the second wall of the base and each being pivotally joined to a midpoint of a respective one of said long levers; said top pan being supported at a respective position on each of said long levers and said short levers;

the second ends of said long levers being joined to the first end of said counterbalance weight lever.

4. The weight scale of claim 3 wherein said adjustable tensioning spring means includes a spring holder plate affixed to said base, a spring tension adjusting screw on said spring holder plate, and a tensioning spring positioned between said spring holder plate and the second ends of said long levers.

5. The weight scale of claim 1 wherein said pivot is adjustably movable between the first and second ends of said counterbalance weight lever.

6. The weight scale of claim 5 wherein said pivot includes a pivot adjusting screw having a user-accessible knob for adjusting the position of said pivot.

7. The weight scale of claim 1 wherein counterbalance weight includes means for selectively adjusting its position on said counterbalance weight lever.

8. The weight scale of claim 1, wherein said adjustable tensioning spring means is coupled to the weight point of said linkage means.

9. The weight scale of claim 1, wherein the first end of said counterbalance weight lever is joined to the weight point of said linkage means.

10. An embedded weight scale for indicating variations in weight of an article wherein the variable weight is embedded within a heavier weight, said article having a base residual weight and a variable embedded weight, the scale comprising:

a base;

a top pan above said base and adapted for supporting said article;

linkage means disposed between said base and said top pan for transmitting the weight of said article, and having a weight point on which appears a virtual weight that represents the weight of said article, said linkage means including a pair of long levers and a pair of short levers, each of the long levers having a first end pivotally supported on said base and a second end, the second ends of the long levers being joined together, each of the short levers having a first end pivotally supported on said base and each being pivotally joined to a midpoint of a respective one of said long levers, said top pan being supported at a respective position on each of said long levers and said short levers;

a counterbalance pivot on said base;

a counterbalance weight lever having a first end coupled to the weight point of said linkage means, said counterbalance weight lever extending across said counterbalance pivot to a second end, and including a counterbalance weight supported on said second end thereof, said counterbalance weight lever having a range of movement that corresponds to a range of weight that includes the embedded weight of said article;

an adjustable tensioning spring means for applying an adjustable tension on said counterbalance weight lever at the weight point of said linkage means, the second ends of said long levers being coupled to the first end of said counterbalance weight lever; and weight indicating means including a sensor for sensing variation in the position of said counterbalance weight lever within its range.

11. The embedded weight scale of claim 10 wherein said adjustable tensioning spring means includes a spring holder plate affixed to said base, a spring tension adjusting screw on said spring holder plate, and a tensioning spring positioned between said spring holder plate and the second ends of said long levers.

12. The embedded weight scale of claim 10 wherein said pivot is adjustably movable between the first and second ends of said counterbalance weight lever.

13. The embedded weight scale of claim 12 wherein said pivot includes a pivot adjusting screw having a user-accessible knob for adjusting the position of said pivot.

14. The embedded weight scale of claim 10 wherein counterbalance weight includes means for adjusting its position on said counterbalance weight lever.

15. A weight scale for indicating variations in weight of an article, the article being characterized as having a residual weight, a weight heavier than the residual weight, and an embedded weight that varies over a range of values that is greater than the residual weight and less than the heavier weight, said scale comprising:

(a) means for setting a residual weight value for said scale, said residual weight value being associated with the residual weight of the article;

(b) means for setting a critical weight range for said scale, said critical weight range being associated with the range over which the embedded weight of the article varies; and (c) means for setting an upper weight range for said scale, said upper weight range being associated with the heavier weight of the article.

* * * * *